(12) United States Patent
Komatsu et al.

(10) Patent No.: US 9,921,445 B2
(45) Date of Patent: Mar. 20, 2018

(54) LIQUID CRYSTAL DISPLAY DEVICE

(71) Applicant: Japan Display Inc., Tokyo (JP)

(72) Inventors: Hiroaki Komatsu, Tokyo (JP);
Takanori Nakayama, Tokyo (JP);
Saori Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/467,442

(22) Filed: Mar. 23, 2017

(65) Prior Publication Data

US 2017/0192324 A1    Jul. 6, 2017

Related U.S. Application Data

(63) Continuation of application No. 14/532,028, filed on Nov. 4, 2014, now Pat. No. 9,638,971.

(30) Foreign Application Priority Data

Nov. 6, 2013   (JP) .................................. 2013-230505

(51) Int. Cl.
*G02F 1/1343* (2006.01)
*G02F 1/1337* (2006.01)
*G02F 1/1339* (2006.01)
*G02F 1/1362* (2006.01)
*G02F 1/1368* (2006.01)

(52) U.S. Cl.
CPC ...... *G02F 1/136227* (2013.01); *G02F 1/1368* (2013.01); *G02F 1/13394* (2013.01); *G02F 1/133784* (2013.01); *G02F 1/134363* (2013.01); *G02F 1/136286* (2013.01); *G02F 2001/136236* (2013.01); *G02F 2201/121* (2013.01); *G02F 2201/123* (2013.01); *G02F 2201/14* (2013.01)

(58) Field of Classification Search
CPC ..................... G02F 1/136227; G02F 1/134363
See application file for complete search history.

(56) References Cited

U.S. PATENT DOCUMENTS

| 7,518,696 | B2 | 4/2009 | Jang et al. |
| 2013/0020579 | A1 | 1/2013 | Nagami |

FOREIGN PATENT DOCUMENTS

| JP | 2003-337338 A | 11/2003 |
| JP | 2010-2594 A | 1/2010 |
| JP | 2010-078944 A | 4/2010 |
| JP | 2013-007955 A | 1/2013 |

OTHER PUBLICATIONS

Japanese Office Action issued on Aug. 15, 2017 for corresponding Japanese Application No. 2013-230505.

*Primary Examiner* — Joseph L Williams
(74) *Attorney, Agent, or Firm* — TYPHA IP LLC

(57) ABSTRACT

To provide a liquid crystal display device capable of controlling deterioration of contrast even in the case where an opening is formed in an organic flattened film and the film has unevenness. In the liquid crystal display device that includes a TFT substrate, a CF substrate, and liquid crystal sandwiched between the TFT substrate and the CF substrate and that drives the liquid crystal with a lateral electric field, the TFT substrate has the organic flattened film in which a through hole for contacting a source electrode of the TFT and a pixel electrode and a sectional shape of the through hole is asymmetrical between a side on which the pixel electrode extends and the other side.

5 Claims, 13 Drawing Sheets

F I G . 8 B
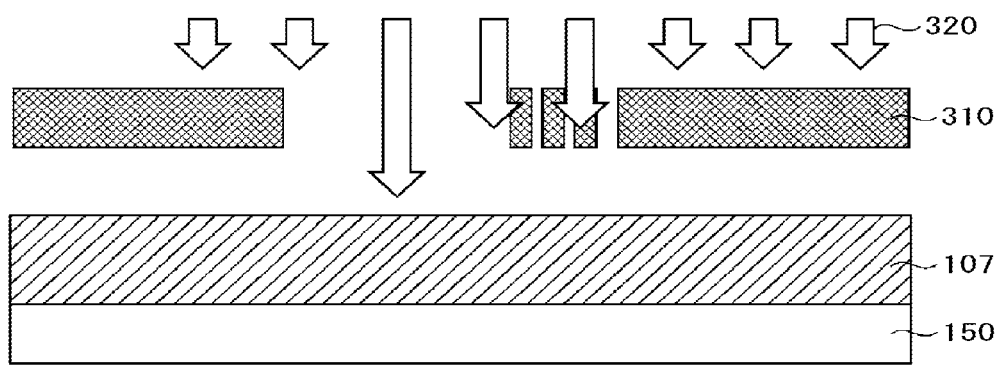

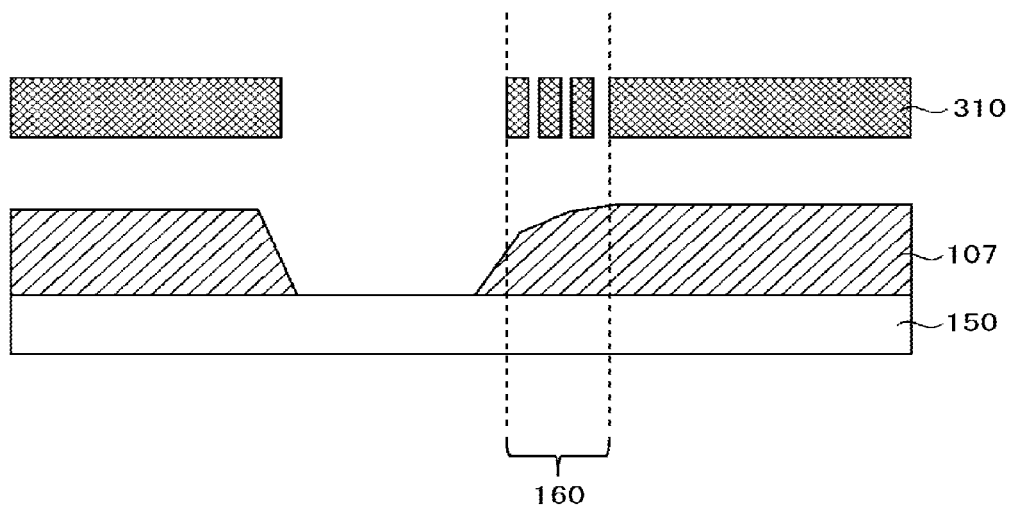
F I G . 8C

LIQUID CRYSTAL DISPLAY DEVICE

CROSS-REFERENCE TO RELATED APPLICATIONS

This application is a continuation of U.S. patent application Ser. No. 14/532,028, filed on Nov. 4, 2014. Further, this application claims priority from Japanese patent application Number 2013-230505 filed Nov. 6, 2013 the contents of which are hereby incorporated by reference into this application.

FIELD OF THE INVENTION

The present invention relates to a liquid crystal display device.

BACKGROUND OF THE INVENTION

Since the liquid crystal display device is flat and lightweight, its uses have spread in various fields from large display devices such as TV to small display devices such as a cellular phone and a digital still camera (DSC). In the liquid crystal display device, a TFT substrate in which pixels each having a pixel electrode, a thin film transistor (TFT), etc. are formed in a matrix and a counter substrate (CF substrate) that faces the TFT substrate and in which color filters etc. are formed in places corresponding to the pixel electrodes of the TFT substrate are arranged, and liquid crystal is sandwiched between the TFT substrate and the counter substrate.

Usually, display of a liquid crystal display device is performed by changing an alignment direction of liquid crystal molecules sandwiched by these substrates by applying an electric filed thereto and using variation of optical characteristics of a liquid crystal layer caused by it. The alignment direction of the liquid crystal molecules when no electric filed is applied is defined by, for example, an alignment film having been subjected to a rubbing treatment on its surface. The rubbing is disclosed in, for example, Japanese Unexamined Patent Application Publication No. 2010-2594.

SUMMARY OF THE INVENTION

In liquid crystal display devices, demands of wide viewing angle and high contrast are high. Thereupon, a situation of contrast has been examined using a lateral electric field mode liquid crystal display device capable of providing the wide viewing angle. A plan view (partial perspective view) of a pixel region of the liquid crystal display device that was examined is shown in FIG. 1A, an outline sectional view in a line A-A' of FIG. 1A is shown in FIG. 7A, and an outline sectional view in a line B-B' of FIG. 1A is shown in FIG. 7B. Gate wiring 115 serves as a scanning signal line, and drain wiring 110 is a video signal line (FIG. 1A). A pixel electrode 120 is formed of ITO that is a transparent electrode, is a comb-like shaped electrode whose tip ends are closed (FIG. 1A), and is connected to a source electrode 121 through an opening provided on an organic flattened film 107 (FIG. 7A). The source electrode 121 is connected to a source region of a semiconductor layer 125 (FIG. 7B). Moreover, a common electrode 130 for forming a lateral electric field in a liquid crystal layer between the pixel electrode 120 and itself is formed on the organic flattened film 107 (FIG. 7A).

Incidentally, names of a source, a drain, etc. are expedient, and when one of them is called the source, the other can be called the drain.

A configuration of a TFT substrate 100 will be explained. A first ground film 102 is formed of SiN on a glass substrate 101, and a second ground film 103 is formed of $SiO_2$ on it.

The semiconductor layer 125 is formed on the second ground film 103 (FIG. 7B). Here, the semiconductor layer 125 is formed of poly-Si. The poly-Si film is formed by first depositing an a-Si film by CVD etc. and annealing this a-Si film by irradiation of laser light. A first insulating film (gate insulating film) 104 is formed on the semiconductor layer 125. The gate wiring 115 that is a scanning signal line is formed on the gate insulating film 104 (FIG. 7B).

After the gate wiring 115 is formed, phosphor or boron is doped by ion implantation into the semiconductor layer 125, which is made to be a conductor by giving conductivity to the semiconductor layer 125 other than a portion thereof covered with the gate wiring 115. Subsequently, a second insulating film (first interlayer insulating film) 105 is formed to cover the gate wiring 115. After an opening is formed in the stacked films of the first insulating film 104 and the second insulating film so that a source region and a drain region (not illustrated) of the semiconductor layer 125 may be exposed, drain wiring 110 that is the video signal line, the source electrode 121, etc. are formed on the second insulating film (first interlayer insulating film) 105 (FIG. 7A). The drain wiring 110 that is the video signal line and the source electrode 121 are simultaneously formed in the same layer.

A third insulating film (inorganic passivation film) 106 comprised of SiN is formed to cover the video signal line 110 and the source electrode 121 (FIG. 7A). The flattened film 107 made of an organic film is formed to cover the inorganic passivation film 106. Since the organic flattened film 107 needs to be flattened in its film top part, it is formed as thick as 1 μm to 3 μm.

Moreover, the organic flattened film 107 also has a role as a passivation film for protecting the TFT. The organic flattened film 107 is formed of a photosensitive film (photoresist film) and enables a through hole to be formed by performing etching and development, without forming a further photoresist film.

On the organic flattened film 107, the common electrode 130 having an opening that exposes a through hole portion and a fourth insulating film (second interlayer insulating film) 108 having an opening that further exposes the through hole portion are formed. Subsequently, an opening that exposes the source electrode 121 is formed in the third insulating film, and the pixel electrode 120 and further an alignment film 109 are formed. Next to this, an alignment direction of the alignment film 109 is specified by an alignment process by rubbing.

The liquid crystal display device was manufactured by stacking a CF substrate (counter substrate) 200 with a photo spacer 210 formed facing the above-mentioned TFT substrate on it (FIG. 7A), sealing the liquid crystal between these substrates, and attaching a polarizing plate, a back light, a touch panel, a protective case, etc. thereon if needed. As a result of evaluating a contrast in this liquid crystal display device, it turned out that the contact lowered, especially, in the vicinity of the through hole for contacting the pixel electrode and the source electrode.

An object of this invention is to provide a liquid crystal display device capable of controlling deterioration of the contrast even in the case where an opening is formed in the organic flattened film and the film has unevenness.

Means for Solving the Problem

As one embodiment for attaining the above-mentioned object, the liquid crystal display device is configured to be a liquid crystal display device that is comprised of a first substrate having a TFT and the alignment film, a second substrate having a spacer, and the liquid crystal sandwiched between the first substrate and the second substrate whose gap is specified by the spacer and that drives the liquid crystal with a lateral electric field, characterized in that the first substrate has the organic flattened film in which the through hole for contacting the source electrode of the TFT and the pixel electrode for forming the lateral electric field, and a sectional shape of the through hole is asymmetrical to a central axis of the through hole between a side thereof on which the pixel electrode extends and the other side thereof.

Moreover, the liquid crystal display device is configured to be a liquid crystal display device that is comprised of the first substrate having the TFT and the alignment film, the second substrate having the spacer, and the liquid crystal sandwiched between the first substrate and the second substrate whose gap is specified by the spacer, characterized in that the first substrate has the organic flattened film in which the through hole is formed and that in a side wall upper part of the through hole, a taper angle of the through hole is small on a side thereof on which the pixel electrode extends compared with that on the other side of thereof in order to reduce the non-rubbing region in the taper part of the through hole.

Effects of the Invention

According to the present invention, even in the case where the opening is formed in the organic flattened film and the film has unevenness, it is possible to provide the liquid crystal display device capable of controlling the deterioration of the contrast.

BRIEF DESCRIPTION OF THE DRAWINGS

FIG. 10 is a sectional view of the organic flattened film in a line B-B' shown in FIG. 1A;

FIG. 8B is an outline sectional view for explaining a processing step (exposure step) of the through hole for contact of the organic flattened film in the liquid crystal display device according to the first embodiment of the present invention;

FIG. 8C is an outline sectional view for explaining a processing step (development step) of the through hole for contact of the organic flattened film in the liquid crystal display device according to the first embodiment of the present invention.

DETAILED DESCRIPTION OF THE PREFERRED EMBODIMENTS

Figure 1A:
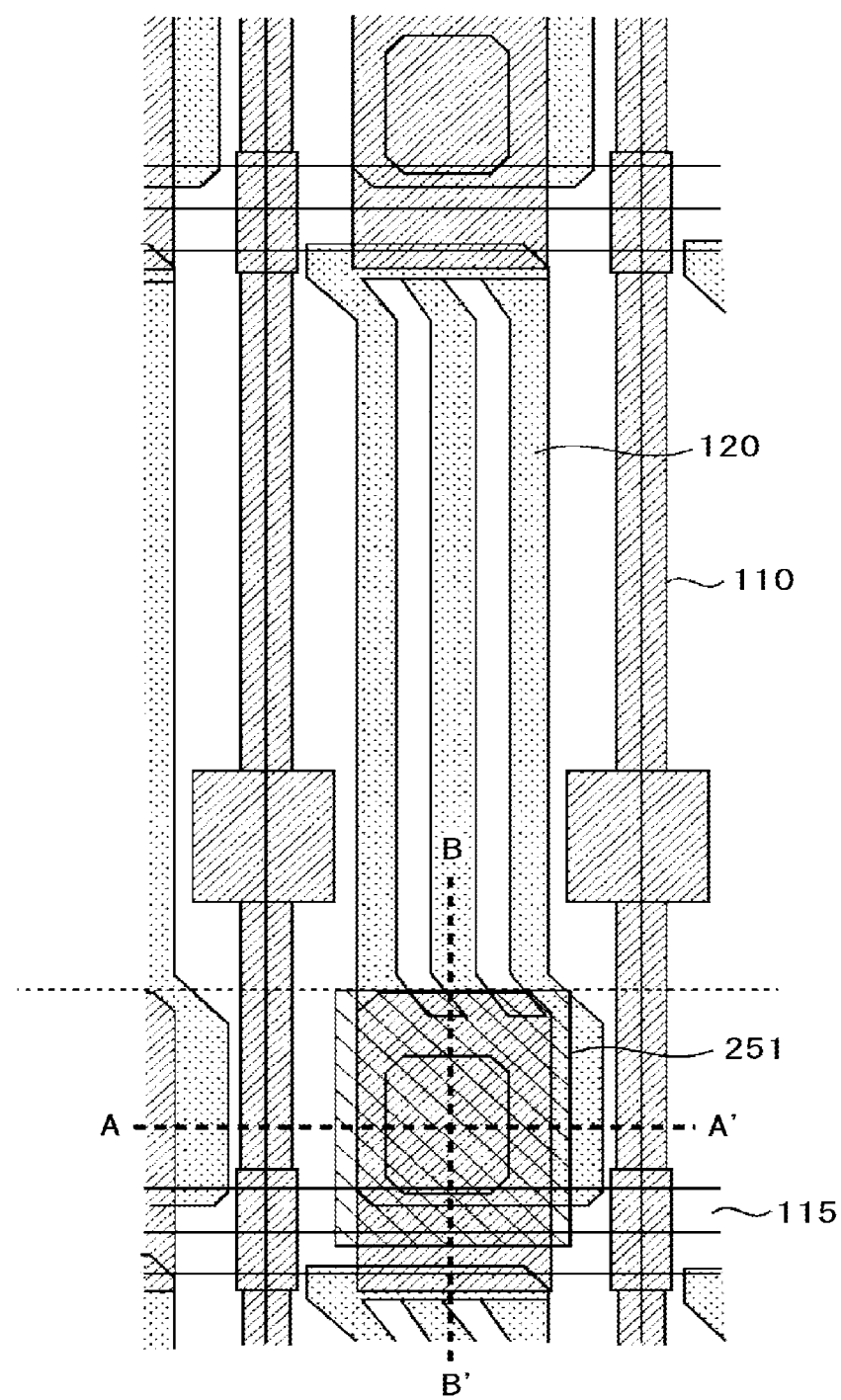
FIG. 1A is an outline plan view (partial perspective view) of a pixel part of a liquid crystal display device that the inventors have examined.
Figure 1B:
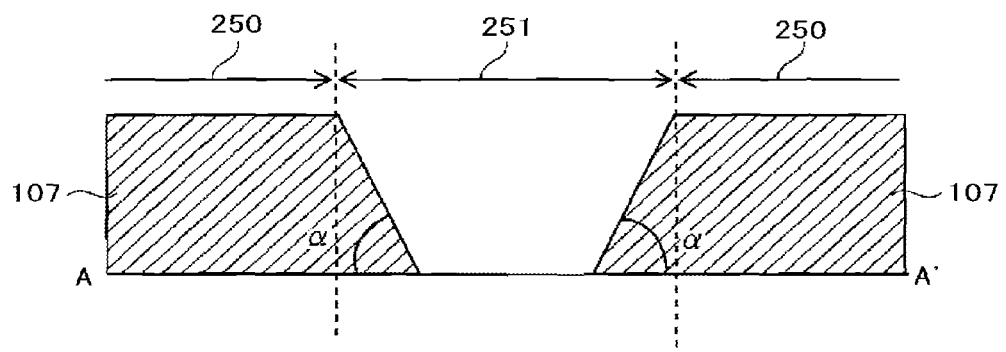
FIG. 1B is a sectional view of an organic flattened film in a line A-A' shown in FIG. 1A.
Figure 1C:
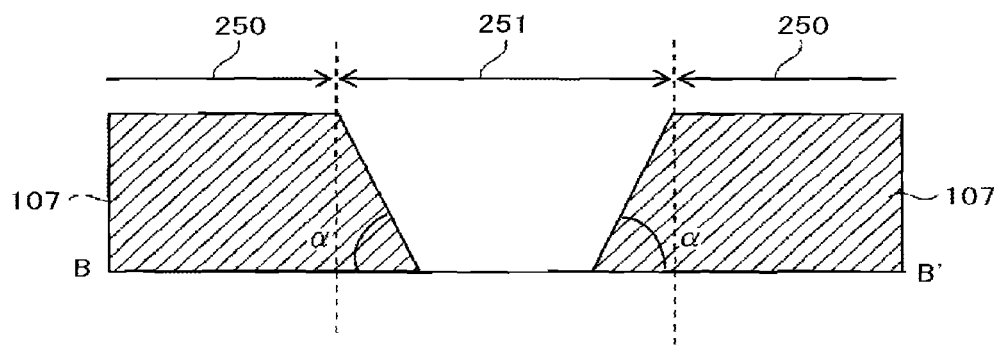
Figure 7A:
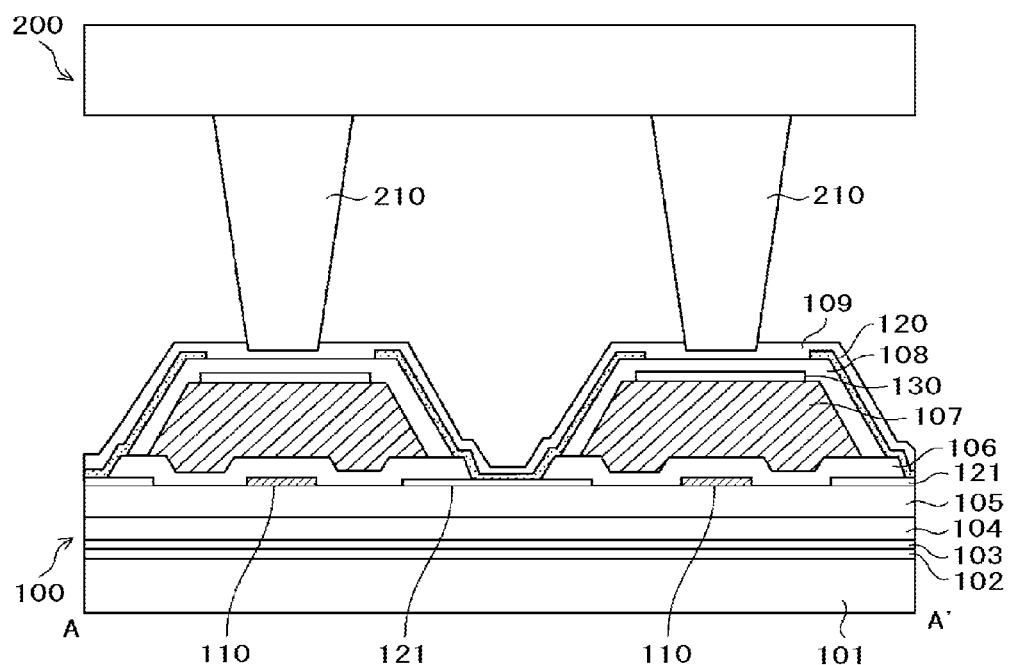
FIG. 7A is an outline sectional view in the line A-A' shown in FIG. 1A or FIG. 2A.
Figure 7B:
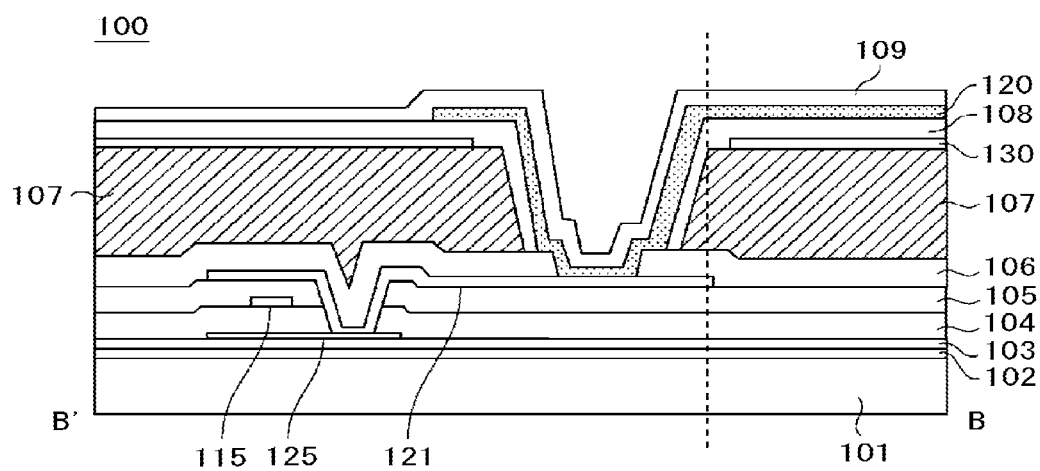
FIG. 7B is an outline sectional view in the line B'-B shown in FIG. 1A.
Figure 9:
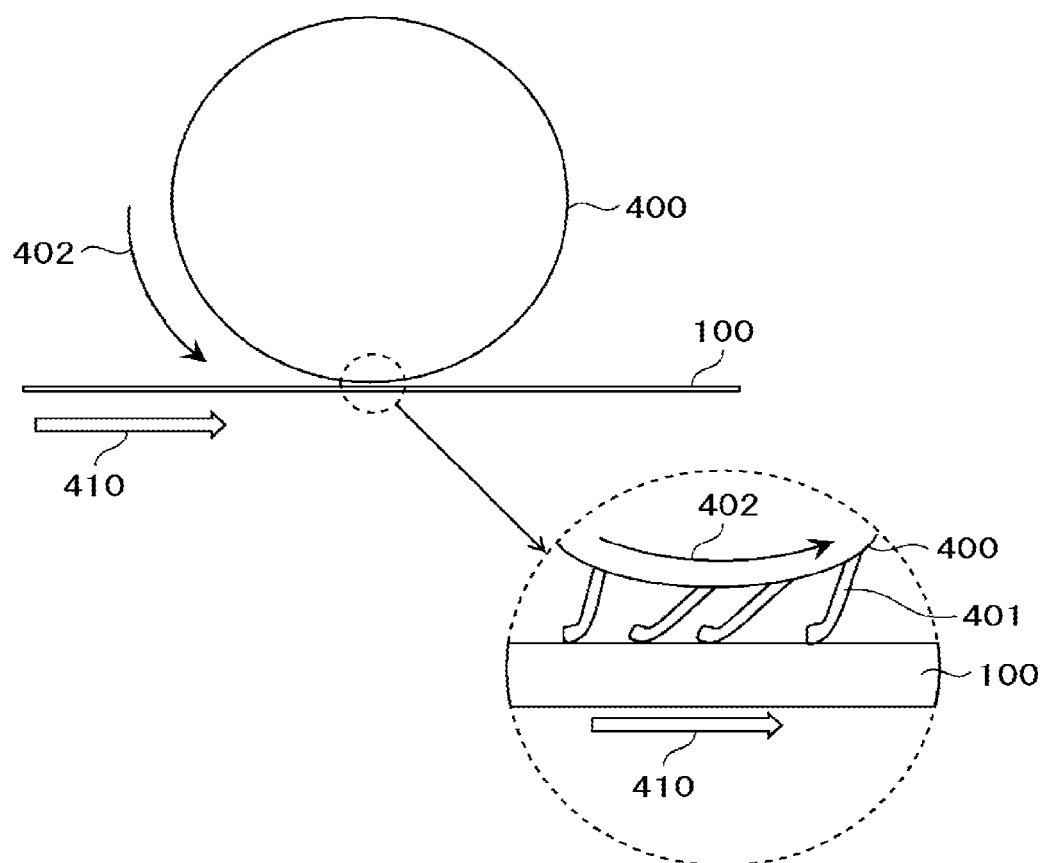
FIG. 9 is an outline side view for explaining an alignment process by rubbing.

In a manufactured liquid crystal display device, since a contrast lowers in the vicinity of a through hole for contacting a pixel electrode and a source electrode, inventors paid their attention to the through hole for contact, especially, an organic flattened film that occupied a most part of its film thickness. FIG. 1B shows a sectional view of the organic flattened film in the line A-A' of FIG. 1A, and the FIG. 1C shows a sectional view of the organic flattened film in the line B-B'. From this sectional shape, it was inferred that deterioration of the contrast occurred because an organic flattened film 107 became a non-rubbing region 251 over a range from the taper top end of the through hole for contact to its inside, which caused light leakage. A reference numeral 250 denotes a rubbing region. Thereupon, when the liquid crystal display device was set to perform black display, a phenomenon in which a periphery part of the through hole on the pixel element electrode side shone white (black luminance is high) was recognized. That is, it turned out that an alignment film in this region was not aligned by an alignment process by rubbing. If this region shining white is shaded, it will lead to lowering of an opening ratio of the pixel, which will be not suitable, and therefore, the inventors have examined reducing the light leakage by other means. The alignment process by rubbing is performed, as shown in FIG. 9, by making a roller 400 around which a rubbing cloth was wound rotate in an arrow direction 402 while moving a TFT substrate 100 on which an alignment film 109 was formed to an arrow direction 410. Since the alignment is specifically performed by making bristles 401 of the rubbing cloth rub the alignment film as shown in an enlarged view of FIG. 9, it seemed that larger the tilt angle α of the through hole taper part, the taper part became difficult to be rubbed. Then, when a taper shape, especially a taper shape at the taper top end was controlled, it was checked that by making small a tilt angle of the through hole at the taper top end, reduction of a non-rubbing region was able to be attained. However, if the tilt angle at the taper top end of the through hole is made small, the whole periphery of the through hole will have the same taper angle (becoming axially symmetrical to the center axis omnidirectionally). That case is not desirable because surface flatness in a gate wiring direction on a side of the TFT substrate that receives a photo spacer 210 shown in FIG. 7A is impaired. Especially, as miniaturization advances, the width of the organic flattened film becomes smaller, which poses a problem. Therefore, in the present invention, the taper shape is controlled only in a desired direction (for example, only the pixel side (a left-hand side of FIG. 3)).

Hereinafter, the present invention will be described in detail using embodiments. Incidentally, the same reference numeral represents the same component.

First Embodiment

A first embodiment of the present invention will be explained using FIG. 2A to FIG. 2C, FIG. 4 to FIG. 6, FIGS. 7A and 7C, and FIG. 8A to FIG. 8C.

Figure 2A:
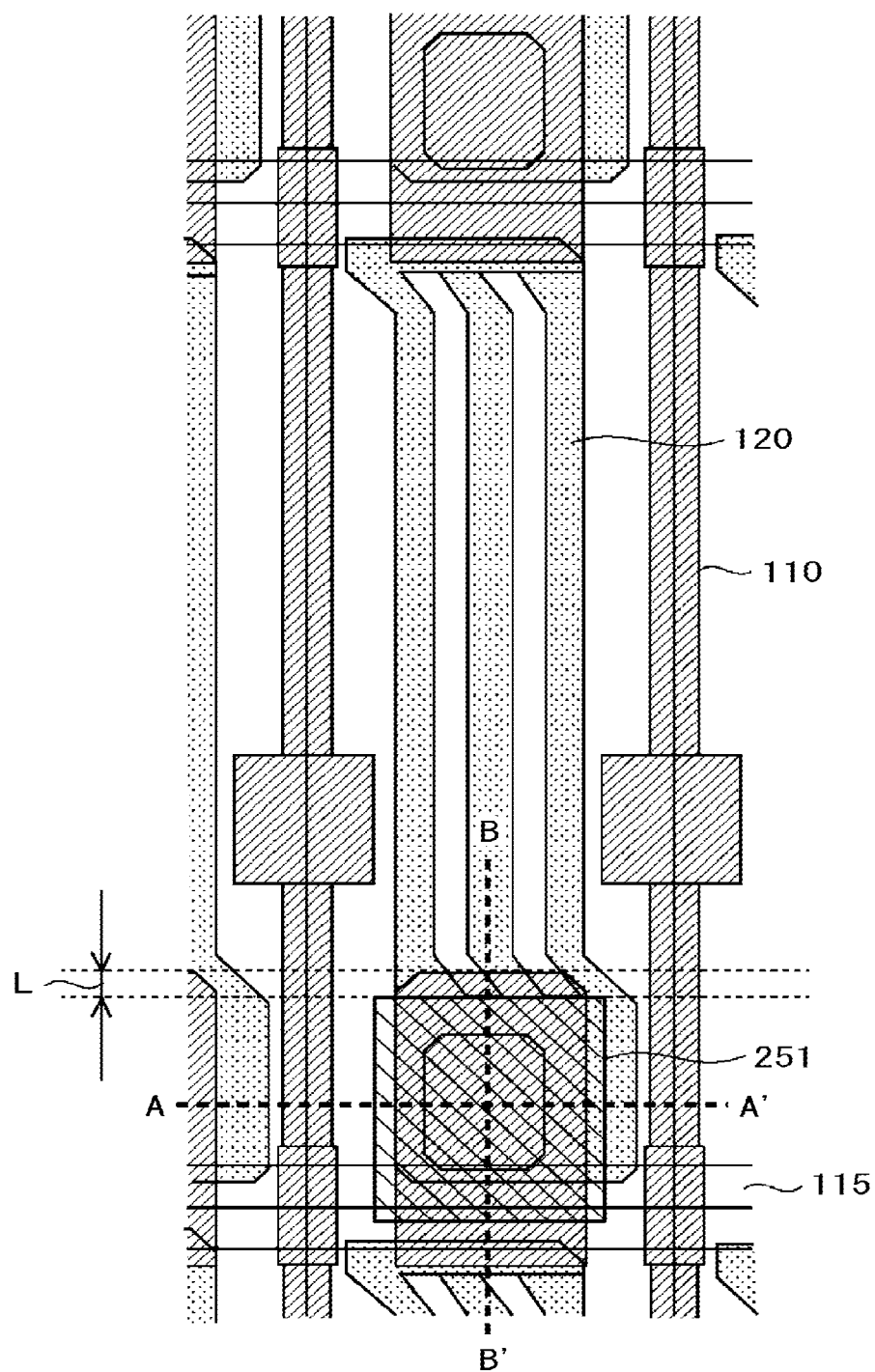
FIG. 2A is an outline plan view (partial perspective view) showing one example of the pixel part of the liquid crystal display device according to a first embodiment of the present invention.
Figure 2B:
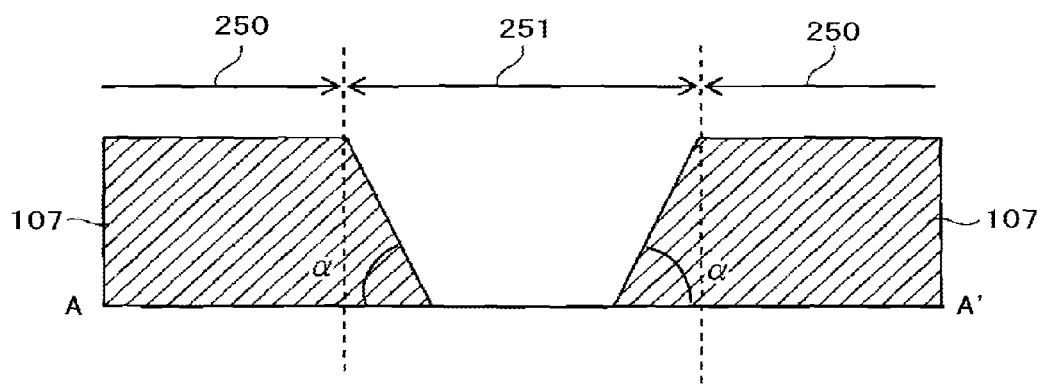
FIG. 2B is a sectional view of the organic flattened film in the line A-A' shown in FIG. 2A.
Figure 2C:
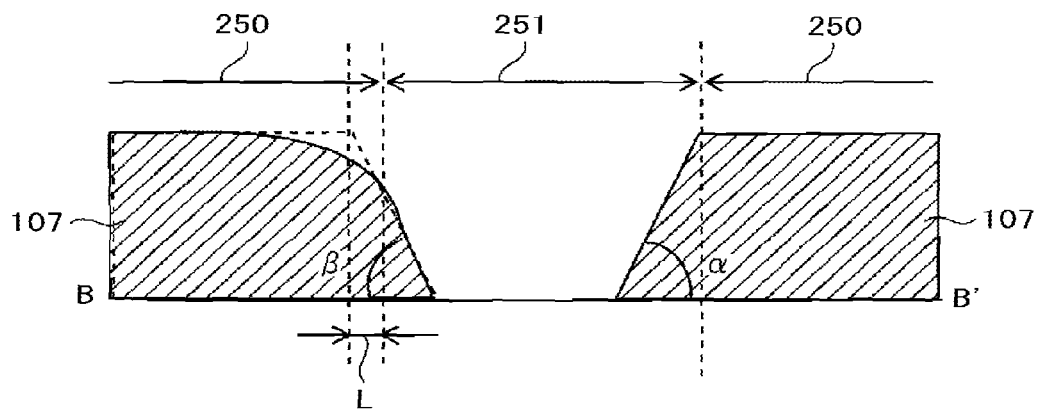
FIG. 2C is a sectional view of the organic flattened film in the line B-B' shown in FIG. 2A.

FIG. 2A shows an outline plan view (partial perspective view) of a pixel part of the liquid crystal display device according to this embodiment, FIG. 2B shows an outline sectional view of the organic flattened film in the line A-A' of FIG. 2A, and FIG. 2C shows an outline sectional view of the organic flattened film in the line B-B' of FIG. 2A. In the line A-A' direction in which the photo spacer is arranged, a taper angle of the through hole is maintained up to the taper top end. On the other hand, on the B side of the line B-B' in which the pixel is arranged, the taper is formed so that the taper angle of the through hole may become small at the taper top end. Thereby, since a wider range of a taper region L is aligned in the alignment process by rubbing (FIG. 2A, FIG. 2C), the non-rubbing region 251 can be reduced.

Figure 3:
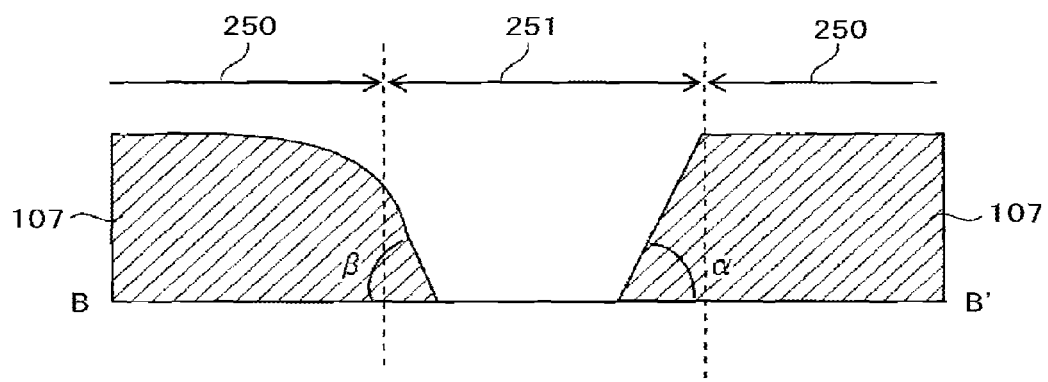
FIG. 3 is a sectional view of the organic flattened film in the line B-B' shown in FIG. 2A.
Figure 4:
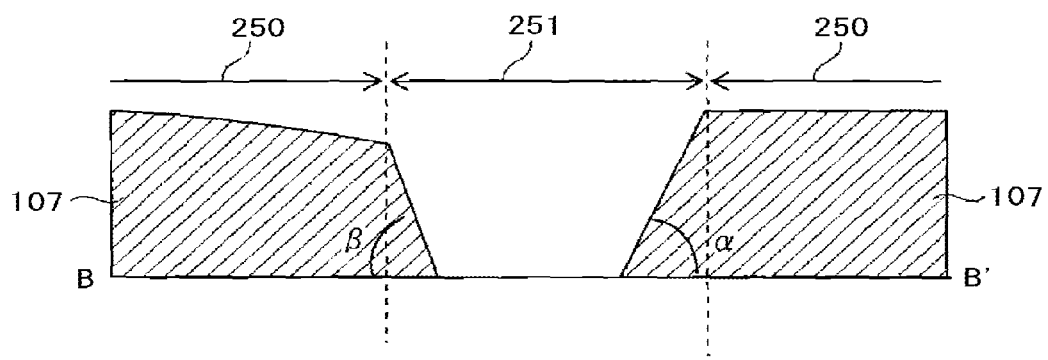
FIG. 4 is a diagram for explaining an organic flattened film in a liquid crystal display device according to a second embodiment of the present invention, and is a sectional view in the line B-B' shown in FIG. 2A.
Figure 5:
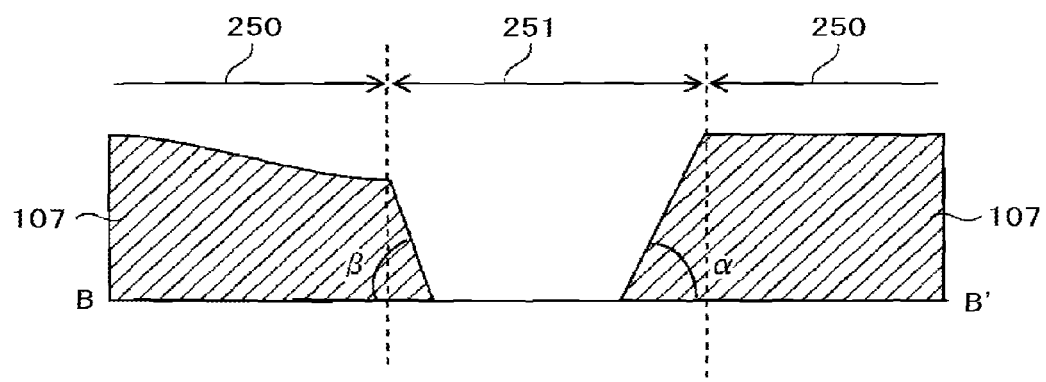
FIG. 5 is a diagram for explaining an organic flattened film in a liquid crystal display device according to a third embodiment of the present invention, and is a sectional view in the line B-B' shown in FIG. 2A.
Figure 6:
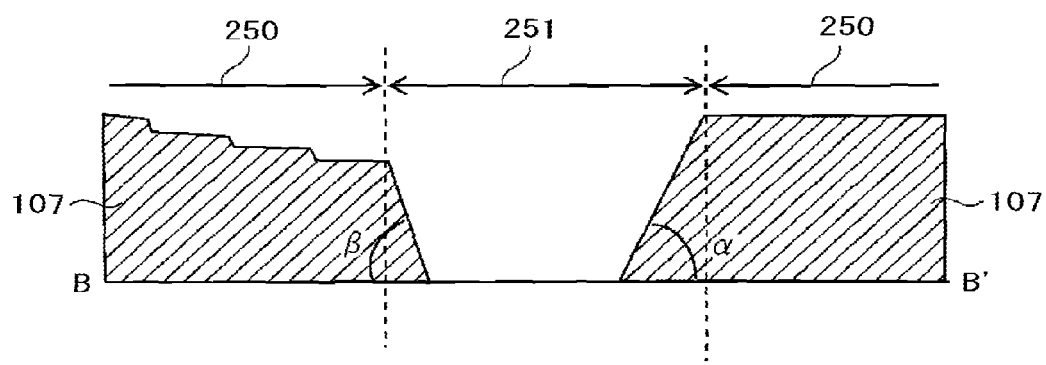
FIG. 6 is a diagram for explaining an organic flattened film in a liquid crystal display device according to a fourth embodiment of the present invention, and is a sectional view in the line B-B' shown in FIG. 2A.
Figure 8A:
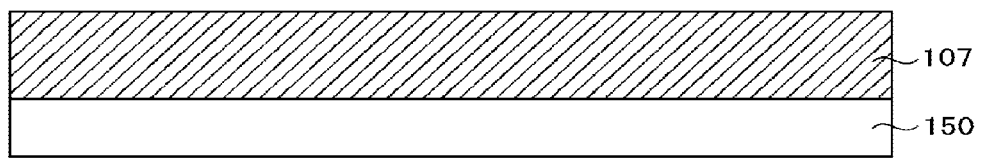
FIG. 8A is an outline sectional view for explaining a processing step (organic flattened film application step) of a through hole for contact of the organic flattened film in the liquid crystal display device according to the first embodiment of the present invention.

Next, a method of making the taper angle of the through hole asymmetrical depending on its direction will be explained using FIG. 8A to FIG. 8C. First, a photosensitive organic flattened film (photoresist film) about 3-μm thick is formed on an underlying substrate 150 on which the TFT etc. are formed (FIG. 8A). Subsequently, the photosensitive organic flattened film is exposed with exposure light 320 using a photomask (half-tone mask) 310 whose transmittance of the exposure light in a region corresponding to the taper part in a direction in which the tilt angle is intended to be made small is varied (FIG. 8B). Subsequently, the through hole is formed by performing treatments of development, cleaning, etc. (FIG. 8C). A spatial relationship of a taper control part 160 and a half-tone mask is as shown in FIG. 8C. A range in which the taper shape is controlled is specified to be one ranging from the through hole and a bending portion of a pixel electrode 120 as a reference (refer to FIG. 2A), and is limited to a region that causes no influence in display. Although a photoresist of positive type was used in this embodiment, the photoresist is not limited to this. Incidentally, since the amount of sensitization in a desired region of the organic flattened film can be varied by varying the transmittance of the exposure light in a region corresponding to the taper part in a direction in which the tilt angle is intended to be made small, the taper part can be not only in a shape shown in FIG. 3 but also in shapes as shown in FIG. 4 to FIG. 6. However, the structure show in FIG. 3 is easy to manufacture. Although a depth of the taper shape to be formed differs depending on conditions of the alignment process, it can be adjusted arbitrarily in accordance with the conditions.

Next, a configuration of the through hole for contact of the liquid crystal display device according to this embodiment will be explained using FIG. 7A and FIG. 7C. FIG. 7A is an outline sectional view in the line A-A' of FIG. 2A and FIG. 7C is an outline sectional view in the line B-B' shown in FIG. 2A.

A first ground film 102 is formed of SiN on a glass substrate 101 and a second ground film 103 is formed of $SiO_2$ on it. The first ground film 102 and the second ground film 103 are both formed in order to protect a semiconductor layer 125 of the TFT from impurities that deposit from the glass.

Figure 7C:
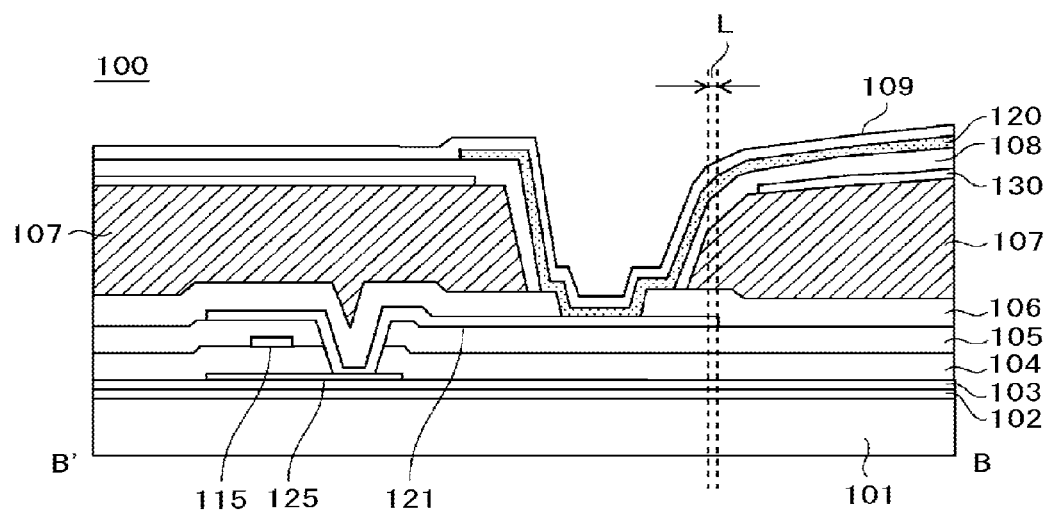
FIG. 7C is an outline sectional view in the line B'-B shown in FIG. 2A.

The semiconductor layer 125 is formed on the second ground film 103 (FIG. 7C). In this embodiment, the semiconductor layer 125 is formed of poly-Si. The poly-Si film is formed by first depositing an a-Si film by CVD etc. and annealing this a-Si film by irradiation of laser light. A first insulating film (gate insulating film) 104 is formed on the semiconductor layer 125. Gate wiring 115 that is a scanning signal line is formed on the gate insulating film 104 (FIG. 7C).

After the gate wiring 115 is formed, the semiconductor layer 125 is made to be a conductor by doping phosphor, boron, or the like by ion implantation to the semiconductor layer 125 and giving conductivity to the semiconductor layer 125 other than the portion covered with the gate wiring 115. Subsequently, a second insulating film (first interlayer insulating film) 105 is formed to cover the gate wiring 115. After an opening is formed in the stacked films of the first insulating film 104 and the second insulating film so that a source region and a drain region (not illustrated) of the semiconductor layer 125 may be exposed (FIG. 7A), drain wiring 110 that is a video signal line, a source electrode 121, etc. are formed on the second insulating film (first interlayer insulating film) 105. The drain wiring 110 that is the video signal line and the source electrode 121 are simultaneously formed in the same layer.

A third insulating film (inorganic passivation film) 106 comprised of SiN is formed to cover the video signal line 110 and the source electrode 121 (FIG. 7A). A role of the inorganic passivation film 106 is to protect the TFT. The flattened film 107 made of the organic film is formed to cover the inorganic passivation film 106. The organic flattened film 107 is formed in order to maintain flatness of the common electrode 130 or the pixel electrode 120. Since the organic flattened film 107 needs to be flattened in its film top part, it is formed thick to be 1 μm to 3 μm.

Moreover, the organic flattened film 107 also has a role as a passivation film for protecting the TFT. The organic flattened film 107 is formed of a photosensitive film such as an acrylic resin and a polyimide resin, and enables the through hole to be formed without forming a resist film separately. The through hole is formed as explained using FIG. 8A to FIG. 8C, and has an asymmetrical form such that an angle of a taper top end of the through hole becomes small in a pixel electrode direction compared with those of other directions.

On the organic flattened film 107, the common electrode 130 having an opening that exposes the through hole and further a fourth insulating film (second interlayer insulating film) 108 having an opening that exposes the through hole are formed. The second interlayer insulating film 108 is formed in order to maintain insulation between the common electrode 130 and the pixel electrode 120. Subsequently, an opening from which the source electrode 121 exposes is formed in the third insulating film, and the comb-like shaped pixel electrode 120 and further the alignment film 109 are formed on it. Next to this, an alignment direction of the alignment film 109 is specified by the alignment process by rubbing. Since the through hole of the organic flattened film was configured so that an angle of the taper top end of the through hole might be made small at a side thereof where the pixel electrode extends compared with the other side thereof, it is possible to reduce the non-rubbing region by an amount of the region L (FIG. 7C). Moreover, since the taper angle of the through hole was large in the line A-A' direction (a direction going along the gate wiring that is the scanning signal line) of FIG. 2A, an upper surface of the organic flattened film was able to be flattened in a wide range, and it was possible to arrange the photo spacer for holding a gap of the TFT substrate and the CF substrate in a flat region on the TFT substrate.

The liquid crystal display device was manufactured by stacking a CF substrate 200 with the photo spacer 210 formed facing the above-mentioned TFT substrate on it (FIG. 7A), sealing the liquid crystal between these substrates, and attaching a polarizing plate, a back light, a touch panel, a protective case, etc. thereon. As a result of evaluating the contrast in this liquid crystal display device, it was possible to reduce the light leakage in the vicinity of the through hole for contacting the pixel electrode and the source electrode, to reduce the black luminance, and to control the deterioration of the contrast. Moreover, it was possible to acquire a wide viewing angle by adopting a lateral electric field mode.

From the above, according to this embodiment, even in the case where the opening is formed in the organic flattened film and the film has unevenness, it is possible to provide the liquid crystal display device cable of controlling the deterioration of the contrast by making small the angle of the taper top end of the opening in the pixel electrode direction compared with those in the other directions. Moreover, by making large the angle of the taper top end of the opening in the gate wiring direction compared with that in the pixel electrode direction, it is possible to arrange the photo spacer in the flat region on the TFT substrate.

Second Embodiment

A second embodiment of the present invention will be described using FIG. 4. Incidentally, any matter that was described in the first embodiment and is not described in this embodiment can be applied to this embodiment unless there are special circumstances. In this embodiment, a structure shown in FIG. 4 was used as that of the organic flattened film.

As a result of adopting the same configuration as that of the first embodiment except the structure of the organic flattened film, it was possible to reduce the non-rubbing region because the through hole of the organic flattened film was configured so that the angle of the taper top end of the through hole might be made small in a direction in which the pixel electrode extends compared with those of the other directions. Moreover, since in the direction going along the gate wiring that is the scanning signal line, the taper angle of the through hole is large, the upper surface of the organic flattened film was able to be flattened in a wide range, and it was possible to arrange the photo spacer for holding the gap of the TFT substrate and the CF substrate in the flat region on the TFT substrate. Moreover, by configuring the taper part of the through hole to have a two-stage structure of a high-angle tilt and a low-angle tilt, it was possible to make small the variation of the boundary between the rubbing region 250 and the non-rubbing region 251 compared with the first embodiment having a configuration in which the tilt angle varied continuously.

As a result of manufacturing the liquid crystal display device by stacking the CF substrate 200 with the photo spacer 210 formed facing the above-mentioned TFT substrate on it (FIG. 7A), sealing the liquid crystal between these substrates, and attaching the polarizing plate, the back light, the touch panel, the protective case, etc. thereon and evaluating its contrast, it was possible to reduce the light leakage in the vicinity of the through hole for contacting the pixel electrode and the source electrode, to reduce the black luminance, and to control the deterioration of the contrast. Moreover, it was possible to achieve the wide viewing angle by adopting the lateral electric field mode. From the above, according to this embodiment, it is possible to acquire the same effect as that of the first embodiment. Moreover, it is possible to reduce the variation of the non-rubbing region compared with the first embodiment.

Third Embodiment

A third embodiment of the present invention will be described using FIG. 5. Incidentally, any matter that was described in the first embodiment and is not described in this embodiment can be applied to this embodiment unless there are special circumstances. In this embodiment, a structure shown in FIG. 5 is used as that of the organic flattened film.

As a result of manufacturing it in the same manner as in the first embodiment except the structure of the organic flattened film, it was possible to reduce the non-rubbing region because in the through hole of the organic flattened film, the angle of the taper top end of the through hole in a direction in which the pixel electrode extended was made small compared with those in the other directions. Moreover, since in the direction going along the gate wiring that is the scan signal line, the taper angle of the through hole is large, the upper surface of the organic flattened film was able to be flattened in a wide range, and it was possible to arrange the photo spacer for holding the gap of the TFT substrate and the CF substrate in the flat region on the TFT substrate. Moreover, by configuring the taper part of the through hole to have the virtually two-stage structure of the high-angle tilt and the low-angle tilt in the direction in which the pixel electrode extends, it was possible to make small the variation of the boundary of the rubbing region 250 and the non-rubbing region compared with the first embodiment having the configuration in which the tilt angle varied continuously.

The liquid crystal display device was manufactured by stacking the CF substrate 200 with the photo spacer 210 formed facing the above-mentioned TFT substrate on it (FIG. 7A), sealing the liquid crystal between these substrates, and attaching the polarizing plate, the back light, the touch panel, the protective case, etc. thereon, and its contrast was evaluated. As a result, it was possible to reduce the light leakage in the vicinity of the through hole for contacting the pixel electrode and the source electrode, to reduce the black luminance, and to control the deterioration of the contrast. Moreover, it was possible to achieve the wide viewing angle was by adopting the lateral electric field mode. From the above, according to this embodiment, it is possible to acquire the same effect as that of the first embodiment. Moreover, it is possible to reduce the variation of the non-rubbing region compared with the first embodiment.

Fourth Embodiment

A fourth embodiment of the present invention will be described using FIG. 6. Incidentally, any matter that was described in the first embodiment and is not described in this embodiment can be applied to this embodiment unless there are special circumstances. In this embodiment, a structure shown in FIG. 6 was used as that of the organic flattened film.

As a result of manufacturing this embodiment in the same manner as in the first embodiment except the structure of the organic flattened film, it was possible to reduce the non-rubbing region because in the through hole of the organic flattened film, the angle of the taper top end in the direction in which the pixel electrode extends was made small as compared with those in the other directions. Moreover, since the taper angle of the through hole is large in the direction going along the gate wiring that is the scanning signal line, the upper surface of the organic flattened film was able to be flattened in a wide range, and it was possible to arrange the photo spacer for holding the gap of the TFT substrate and the CF substrate in the flat region on the TFT substrate. Moreover, by configuring the taper part of the through hole to have the virtually two-step structure of the high-angle tilt and the low-angle tilt in the direction in which the pixel electrode extends, it was possible to make small the variation of the boundary between the rubbing region 250 and the non-rubbing region 251 as compared with the first embodiment having the configuration in which the tilt angle varied continuously.

The liquid crystal display device was manufactured by stacking the CF substrate 200 with the photo spacer 210 formed facing the above-mentioned TFT substrate on it (FIG. 7A), sealing the liquid crystal between these substrates, and attaching the polarizing plate, the back light, the touch panel, the protective case, etc., thereon and its contrast was evaluated. As a result, it was possible to reduce the light leakage in the vicinity of the through hole for contacting the pixel electrode and the source electrode, to reduce the black luminance, and to control the deterioration of the contrast. Moreover, it was possible to achieve the wide viewing angle by adopting the lateral electric field mode. From the above, according to this embodiment, it is possible to acquire the same effect as that of the first embodiment. Moreover, it is possible to reduce variation of the non-rubbing region compared with the first embodiment.

It should be noted that the present invention is not limited to the above-mentioned embodiments, and various modifications are included within the scope of the present invention. The embodiments described above are explained in detail in order to explain the present invention comprehensively, and are not necessarily limited to those having all the configurations explained above. For example, although the inorganic passivation film 106 is provided in the embodiment, an embodiment may have a structure in which that film is not provided.

What is claimed is:
1. A liquid crystal display device comprising:
a first substrate having a plurality of drain lines, a plurality of gate lines, a plurality of TFT and a plurality of pixel electrodes;
a second substrate having a plurality of spacers;
liquid crystal sandwiched between the first substrate and the second substrate,
the first substrate has an organic film between the TFT and the pixel electrode, the organic film has a through hole for contacting a source electrode of the TFT and the pixel electrode, and
wherein a sidewall shape in the cross section of the through hole is formed asymmetrically in the direction along the drain line and formed symmetrically in the direction along the gate line, and
a common electrode is formed between the organic film and the pixel electrode, and the common electrode is not formed in the through hole.
2. The liquid crystal display device according to claim 1, wherein the spacers are arranged on the drain line through the organic film.
3. The liquid crystal display device according to claim 1, wherein an alignment film is formed between the liquid crystal and the pixel electrode, the alignment film subjected to an alignment treatment by rubbing.
4. The liquid crystal display device according to claim 1, wherein the organic film is formed of a photoresist film, and the through hole is formed by exposing the photoresist film using a half-tone mask.
5. The liquid crystal display device according to claim 1, wherein the through hole contacts the source electrode of the TFT and the pixel electrode for forming the lateral electric field.

* * * * *